Figure 4:
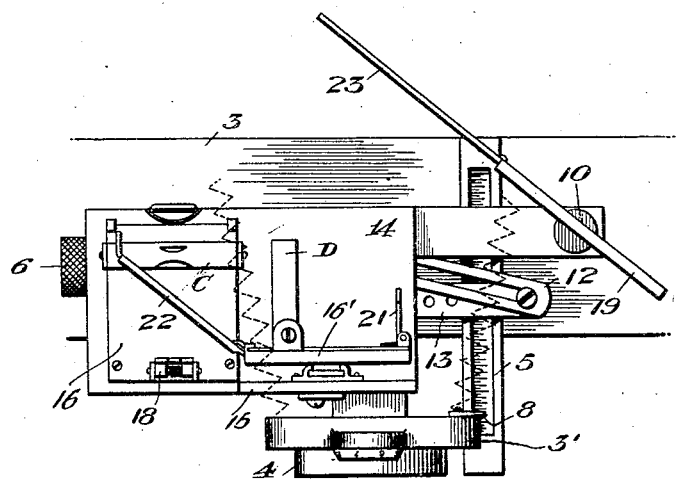

C. B. KNOTT.
FOCUSING DEVICE FOR CAMERAS.
APPLICATION FILED SEPT. 11, 1913.
1,232,333.
Patented July 3, 1917.
3 SHEETS—SHEET 1.
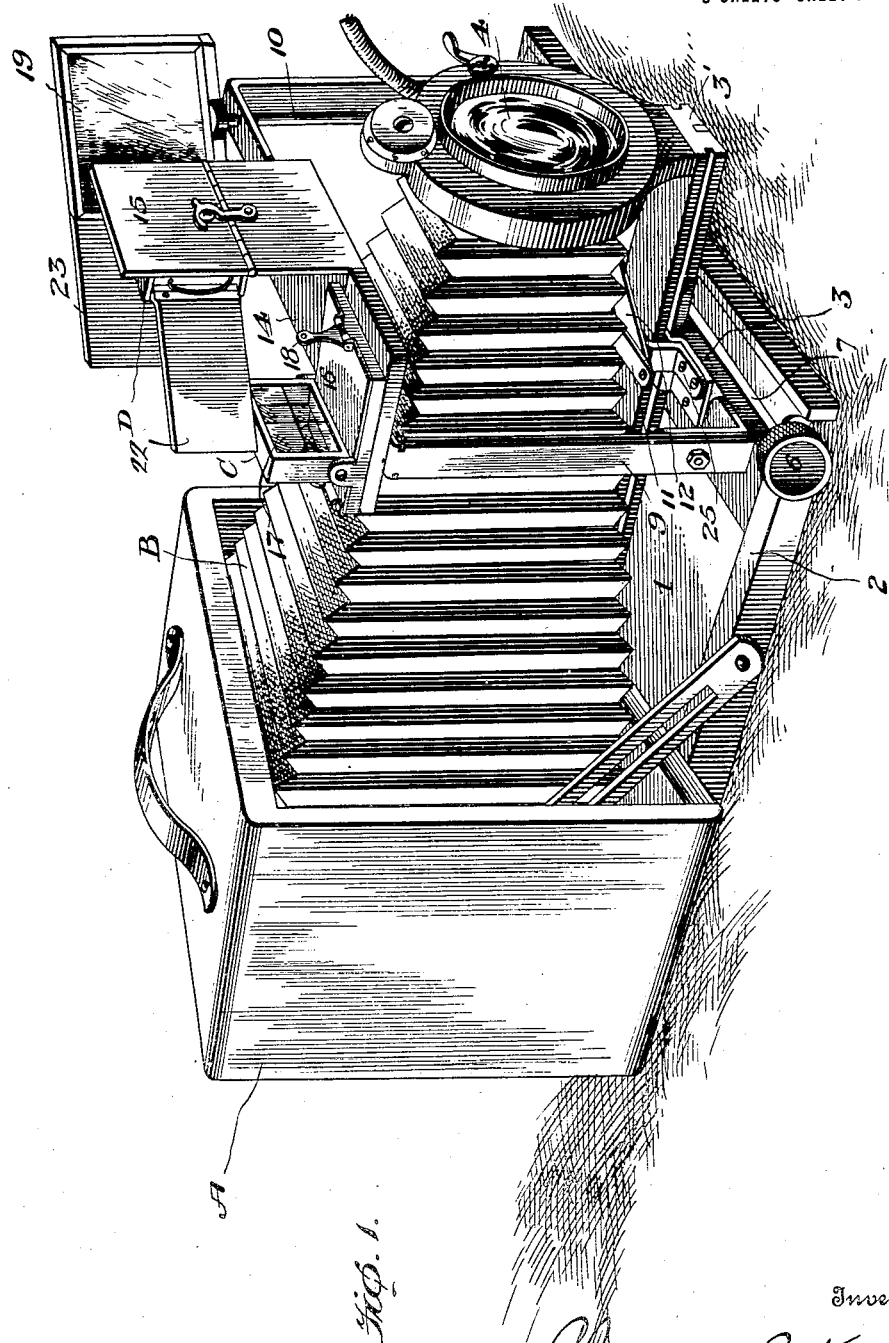

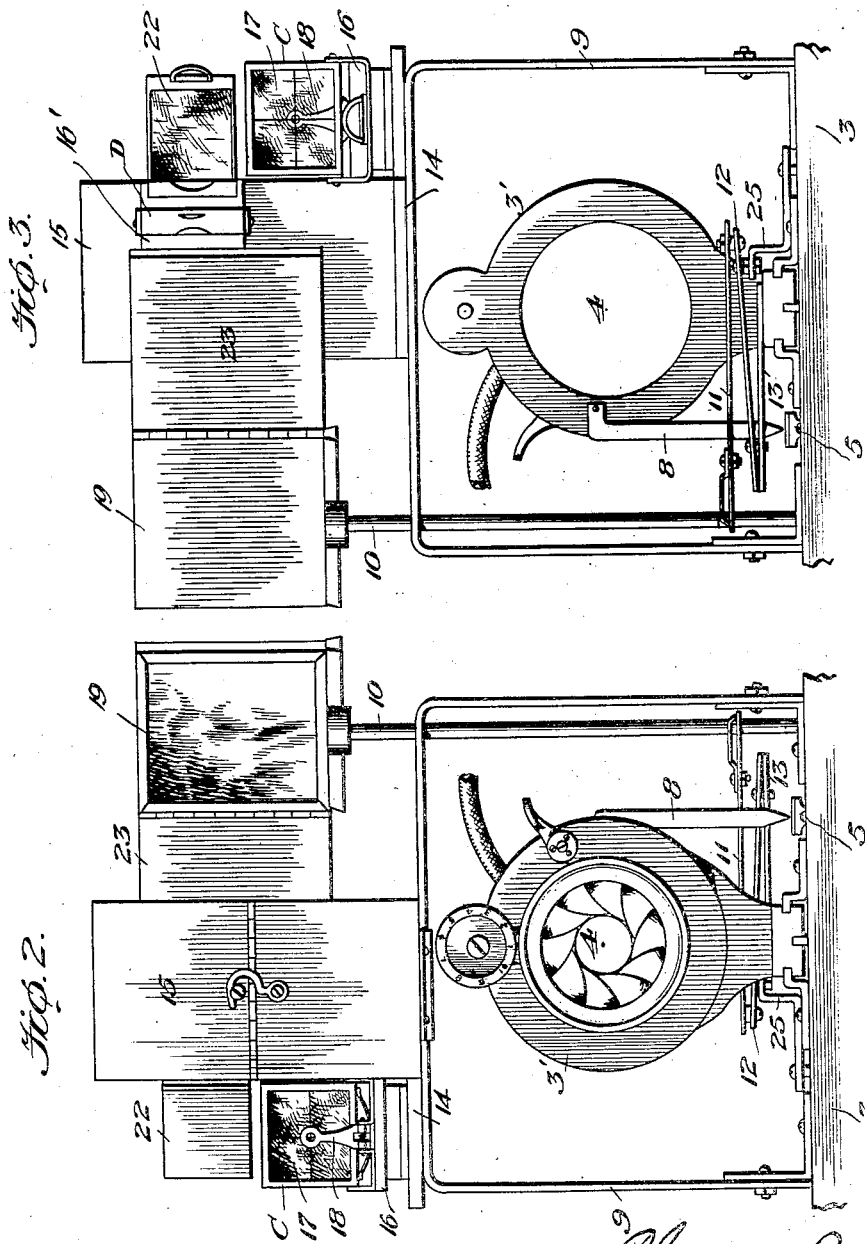

C. B. KNOTT.
FOCUSING DEVICE FOR CAMERAS.
APPLICATION FILED SEPT. 11, 1913.

1,232,333.

Patented July 3, 1917.
3 SHEETS—SHEET 3.

Inventor
Clarence B. Knott

Witnesses

By
Attorney

UNITED STATES PATENT OFFICE.

CLARENCE B. KNOTT, OF NEW YORK, N. Y.

FOCUSING DEVICE FOR CAMERAS.

1,232,333.　　　　Specification of Letters Patent.　　Patented July 3, 1917.

Application filed September 11, 1913.　Serial No. 789,351.

*To all whom it may concern:*

Be it known that I, CLARENCE B. KNOTT, a citizen of the United States, residing at New York city, in county of New York and State of New York, have invented certain new and useful Improvements in Focusing Devices for Cameras, of which the following is a specification.

My invention relates to an improvement in focusing devices for cameras.

In cameras now in ordinary use, it is customary to provide a small finder held at a suitable position on the structure by which the view as it would appear on the plate or film, if photographed, is shown on a reduced scale on the ground-glass screen in reverse, that is, what is on the left side will appear on the right, and what is on the right will appear on the left side.

The lens of the camera will, in a measure, take in and properly show as the eye does, objects which are near and those which are at a distance, but to procure the best result and bring out that part of the view which it is desired to reproduce most prominently, it is necessary to adjust the lens to the proper distance from the plate or film on which the image is to be taken.

Nearly all cameras are provided with a scale showing the position at which the lens should be placed to properly focus the camera for objects which are at a greater or less distance therefrom. These scales are marked in divisions indicating feet or meters. For instance, the scale would have marked thereon the points at which the lens should be positioned to properly focus the camera for an image 5, 6, 8, 10, 15, 25, 50 and 100 feet from the camera. This scale will vary in length from $\frac{7}{8}$ to $1\frac{1}{8}$ of an inch more or less, which means that the lens can be adjusted within the scope of these measurements, and it will consequently be seen that if the distance from the camera lens to the object to be photographed is not properly judged, there is a possibility that the camera may be badly out of focus.

As an example, if it is desired to photograph an object at eight feet from the camera, and, by misjudgment of distance, the lens is set at fifteen on the scale, then an object at fifteen feet from the camera would be in perfect focus, whereas the object which is intended to be brought out prominently would be out of focus, and would consequently be indistinct and blurred.

A further object is to provide a structure with which it is not necessary to darken the portion of the camera on which the image is thrown, as by placing a cloth over the hood in the one instance or looking into the hood in the other instance, and thus the operator can at all times see with the naked eye as well as in the finder just the position and attitude of the subject.

Yet another object is to provide a device which can be applied to any focusing camera now in use without great alterations.

This invention relates to certain novel features of construction and combinations of parts which will be hereinafter fully described and pointed out in the claims.

In the accompanying drawings:—

Figure 5:
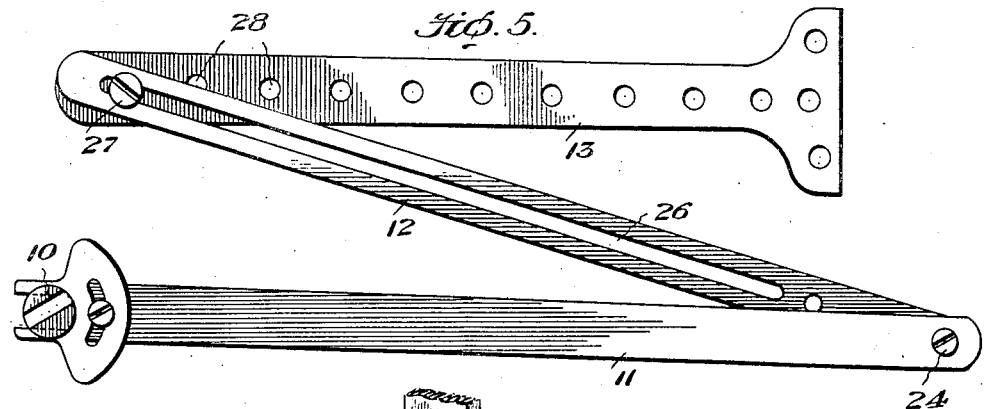
Figure 7:
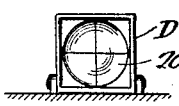
Figure 6:
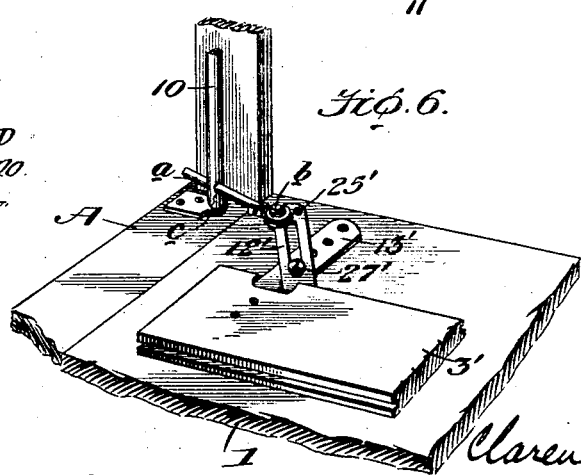

Figure 1 is a perspective view showing the camera with the focusing device in place thereon, Fig. 2 is a view in front elevation, Fig. 3 is a view in rear elevation, Fig. 4 is a top plan view, Fig. 5 is an enlarged detail view of the means for connecting the device with the moving parts of the camera, and, Fig. 6 is a detail perspective view to illustrate a modified form of means for shifting the finding mirror, and Fig. 7 is a detail view showing the lens interposed between the reflectors.

The camera, to which the device is shown attached in the present instance, comprises a box A, which has the front 1 hinged thereto to swing down. A track 2 is provided on the front 1, and the carriage 3, in which the lens 4 is mounted, is constructed to slide on this track.

A scale 5 is secured on the carriage 3. Revolving the thumb-wheel 6 which is connected on the shaft 7, the movable member or base 3' on the carriage 3 is caused to move toward and from the box by an arrangement of gear and rack, or other suitable mechanism (not shown) and the pointer 8 carried by the lens 4 indicates on the scale the distance at which the lens is adjusted to procure the best results. The usual bellows B is provided to make a light-proof structure from the lens 4 to the box A, and the box may be adapted for either plates or films.

A frame 9 is carried by the carriage 3, and is bent to be U-shaped and preferably to rise above and embrace the bellows B.

A shaft 10 is mounted in the frame 9 at one side of the bellows, and by a series of links 11, 12, and 13, as better shown in Fig. 5, so that, as the thumb-wheel 6 is revolved to cause the movable member 3′ of the carriage to be adjusted in the one direction or the other, the shaft 10 is oscillated. A base member 14 is removably connected upon the frame 9, and an upright 15 is connected with this base member to be somewhat forward of the shaft 10.

A finder C is connected with the base member 14 at one side of the upright member. This finder comprises a base 16, on which is supported a concaved lens 17. The lens 17 is ground in such a manner that the image is shown therethrough with the parts properly positioned, and cross-lines are provided to mark the center. A sight 18 is secured to the base 16 in front of the lens 17, and by holding the camera with the lens on the level of the eye, and sighting therethrough with the cross-lines of the lens and the sight 18 in direct line, it is insured that the object on which the sight is taken is at the center of the picture which would be projected from the lens 4 onto the plate or film.

It is not, however, possible in this manner to obtain any idea of the distance of the object from the lens. A mirror 19 is mounted on the upper end of the shaft 10. A finder D similar to the finder C is secured on a base 16′ mounted on the upright member 15 with a lens 20 positioned to sight the mirror 19. The finder D has the lens provided with cross-lines and carried on the base 16′, or in front of the lens is a sight 21. A mirror 22 is carried by the base on that side of the lens away from the sight 21. The mirror 22 is held at such an angle that it reflects the image shown through the lens 20, and as this lens sights the mirror 19 the image shown in the mirror 22 is the reflection of the view in front of the camera as caught in the mirror 19. The mirror 19 has a screen 23 pivoted thereto to be swung to such a position that it prevents the reflection by the mirror 22 of objects directly in front thereof, and limits the reflections in that mirror to what is disclosed in the lens 20.

As set forth, the subject on which the focus is to be taken can be centered in the finder C, and in a like manner the finder D will center on what is reflected by the mirror 19; but the mirror 19 is adjusted at an angle with respect to the plate or film and unless the mirror 19 is at the proper angle, the same part of the view obtained in the mirror 22 is not centered as is centered in the finder C, but the center would be to one side or the other, and it is this principle of which I purpose to take advantage.

The link 11 is secured at its one end with the shaft 10 in such a manner that, as the link is swung, the shaft is revolved or oscillated in the one direction or the other. This link is connected at its free end at 24 with the link 12, and link 12 is pivoted on a bracket 25 connected on the stationary member of the carriage 3. A slot 26 is provided in the link 12, and a screw-bolt 27 passes through this slot and into a screw-threaded opening in one end of the link 13. The link 13 at its opposite end is rigidly secured on the movable member 3′ of the carriage.

From this it will be seen that as the movable member of the carriage is run out and in, the links through their connection cause the shaft 10 to shuttle, and thereby adjust the mirror 19 angularly.

By centering the subject in the finder C, and then turning the thumb-wheel 6 to bring the mirror 19 to the proper angle to throw the reflection in mirror 22 with the same subject centered, the movable member 3′ of the carriage will be brought to a definite point, and the parts are so arranged and adjusted that this point is the proper focus.

The arrangement of links which I have described for changing the angle of the mirror 19 through the rotation of the shaft 10 is particularly well adapted for this function, as when the device is to be applied to a camera having a greater or less focusing run, the point of pivot on the links 12 and 13 can be changed to accommodate the condition. The manner in which this change would be made is better shown in Fig. 5. The screw-bolt 27 would be placed in one of the openings 28 of the lever 13 at a point nearer to the connection and the moving member 3′ of the carriage and the connection to the bracket 25 would be shifted to the required degree.

In the form illustrated in Fig. 6, a link arrangement for swinging the mirror 19 when this mirror is mounted on the box of the camera is disclosed. The shaft 10 is journaled in the box and extends through the top thereof at a suitable point that the mirror 19 removably mounted thereon is in proper position to reflect the view to finder D, which with finder C would be mounted on the top and side respectively of the box A. The link 13′ is secured to the movable member 3′ of the carriage, link 12′ has an adjustable pivotal connection therewith through screw 27′ and the link 12′ is pivoted to the front 1 of the camera at 25′. An opening c is formed through the shaft 10 and the rod a is slidably received through the opening and at its one end has a universal connection with the link 12′. With this arrangement the universal joint and the sliding of the rod *a* through opening *c* permits the front 1 to be brought up against the box A, and yet when the front is open as shown the same result is obtained as with the parts rigid.

In focusing on an object near at hand, it is required that the lens be run out to a distance farther from the plate or film than with an object at a distance, and the run required when focusing under twenty-five feet increases greatly over that when focusing above twenty-five feet. This is admirably taken care of by the arrangement of the levers, as when the short end of lever 12 is swung past the point or pivot, the movement transmitted to the link 11 to throw it around the pivotal connection with the shaft 10 is materially decreased, and consequently the angle of the mirror is shifted in a lessening degree, thus making it necessary to run the carriage out a greater distance to secure the angular adjustment of the mirror and the centering of the subject as reflected in the mirror 22.

The lens 20, finder D, is hinged so that it can be swung down from its position in the path of the reflection from the mirror 19 to the mirror 22, and while this lens is not in position the whole of the reflection as caught in the mirror 19 is not shown in mirror 22, yet that part which is shown is much increased in size, and the details are more clearly defined for the purpose of focusing.

It is evident that the finders C and D, and the mirror 19 can be made detachable, and the parts folded to such a position that they will fit into the box of the camera, or attach in other positions according as the camera may be used in a horizontal or vertical position in taking of a picture. Further, while the device has been described more as being an attachment for a camera, it can be constructed to be an essential part of the camera and to be built therein at the factory.

It is further evident that other changes might be made in the form and arrangement of the parts, as, for instance, the means for causing the mirror 19 to be turned, and the other elements to adapt them to the structure and needs of the camera to which the device is to be applied, and hence I do not wish to limit myself to the precise construction herein set forth, but:—

Having fully described my invention, what I claim as new and desire to secure by Letters Patent, is:—

1. A focusing device for the purpose of determining the position of the lens of a camera so that it shall focus on the plate or film objects at varying distances from the lens, consisting of fixed and movable reflectors, one of which reflectors reflects the view or object in the field before the lens upon the other reflector, and a lens provided with centering means located between the two reflectors for centering the object before the lens in the path of reflection regardless of the adjustment of the movable reflector.

2. A focusing device for cameras, comprising fixed and movable reflectors, and a lens located on a fixed path of reflection capable of centering in the fixed reflector any and every individual object separately along a line of vision, the rays of which coincide with the rays of the fixed path of reflection.

3. The combination with a camera lens and plate, of a movable and a fixed reflector capable of receiving and reflecting to the eye the entire portion of the view or object destined to be brought to a focus on the film or plate, and means operable at the will of the operator interposed between said reflectors for centering the entire field as seen upon the fixed reflector thereupon.

4. The combination with a camera lens, of a movable reflector, and a stationary reflector in the line of vision between the eye and the object, and extensible means, applicable to cameras of different focal lengths, for operating the movable reflector, and adapted to be actuated upon the movement of the lens for causing the movable reflector to be operated for throwing a reflection of the field before the camera on to the stationary reflector, and a screen located adjacent to the movable reflector for preventing reflections onto the stationary reflector from beyond the movable reflector.

5. The combination, with a camera lens, insuring its focus on the ground glass, the film or the plate, of a movable reflector, and a stationary reflector in the line of vision between the eye and the object, and extensible means, applicable to cameras of different focal lengths, for operating the movable reflector, and adapted to be actuated upon the movement of the lens for causing the movable reflector to be operated for throwing a reflection of the field before the camera on the stationary reflector, and a screen located adjacent to the movable reflector for preventing reflections onto the stationary reflector from beyond the movable reflector, and means located in the fixed path of reflection capable of centering in the fixed reflector any and every individual object along a line of vision, separately, the rays of which coincide with the rays of the fixed path of reflection, which is from the eye to the fixed reflector and from the fixed reflector to the moving reflector.

6. The combination with a camera lens and plate, of a movable and a fixed reflector capable of receiving and reflecting to the eye the entire portion of the view or object destined to be brought to a focus on the film or plate, and a hinged lens having centering means thereon interposed between said reflectors for centering the entire field upon the fixed reflector, said lens being adapted to be moved out of the path of the reflection.

7. The combination with a camera lens, of a movable and stationary reflector, a plurality of links connected together and to the movable reflector and lens, whereby upon the movement of the lens the movable reflector will be operated for throwing a reflection of the field before the camera onto the stationary reflector, one of the links having a slot therein, and adjustable means on another link received in the slot, whereby the links may be adjusted to cameras of different focal length.

8. The combination with a camera lens, of a fixed reflector, a movable reflector for reflecting the view or field before the lens onto the fixed reflector, means in the path of the reflection for centering the reflected view or field on the fixed reflector to indicate when the lens is in focus, and a plurality of links adjustably connected together and to the lens and movable reflector for causing the movement of the movable reflector on the movement of the lens, one of the links being provided with a plurality of openings and another with a slot, and means for passing through an opening and the slot of the links, whereby the links may be adjusted to cameras of different focal length.

9. The combination with a camera lens, of a movable and stationary reflector, a plurality of links connected together and to the movable reflector and lens, whereby, upon the movement of the lens, the movable reflector will be operated for throwing a reflection of the field before the camera onto the stationary reflector, one of the links being provided with an elongated slot, and another provided with means for forming an adjustable connection between the two links that they may be adapted to cameras of different focal lengths.

10. A focusing device for cameras, comprising fixed and movable reflectors, and a lens provided with centering means located between the reflectors for locating and centering in the fixed reflector any individual part of or the complete object along a line of vision, the rays of which coincide with the rays of the fixed path of reflection.

11. A focusing device for cameras, comprising fixed and movable reflectors, and a lens provided with centering means located between the reflectors for locating and centering in the fixed reflector any individual part of or the complete object along a line of vision, the rays of which coincide with the rays of the fixed path of reflection, and a screen located with relation to the reflectors so that all other than the desired light rays are prevented from being reflected in the fixed reflector.

In testimony whereof I affix my signature in the presence of two witnesses.

CLARENCE B. KNOTT.

Witnesses:
EDWARD A. EATON,
FREDERICK BEGGERMAN.